US006704645B1

(12) United States Patent
Beesley et al.

(10) Patent No.: US 6,704,645 B1
(45) Date of Patent: Mar. 9, 2004

(54) SYSTEM AND METHOD FOR ESTIMATING IMPEDANCE TIME THROUGH A ROAD NETWORK

(75) Inventors: Darin J. Beesley, Overland Park, KS (US); Michael Childs, Olathe, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/015,152

(22) Filed: Dec. 11, 2001

(51) Int. Cl.[7] .............................................. G01C 21/26

(52) U.S. Cl. ......................... 701/202; 701/23; 701/209; 340/990

(58) Field of Search ........................... 701/200, 23, 25, 701/202, 208, 209, 117, 118; 340/988, 990

(56) References Cited

U.S. PATENT DOCUMENTS

| | | | | |
|---|---|---|---|---|
| 3,660,812 A | * | 5/1972 | Inose et al. | |
| 4,926,336 A | * | 5/1990 | Yamada | 701/209 |
| 4,937,753 A | * | 6/1990 | Yamada | 701/209 |
| 5,729,458 A | | 3/1998 | Poppen | 364/464.1 |
| 5,878,368 A | | 3/1999 | DeGraaf | 701/209 |
| 5,893,081 A | | 4/1999 | Poppen | 705/400 |
| 5,902,349 A | | 5/1999 | Endo et al. | 701/202 |
| 5,951,622 A | * | 9/1999 | Nomura | 701/212 |
| 6,023,655 A | * | 2/2000 | Nomura | 701/208 |
| 6,061,630 A | * | 5/2000 | Walgers et al. | 701/210 |
| 6,128,573 A | * | 10/2000 | Nomura | 701/208 |

* cited by examiner

*Primary Examiner*—Gertrude Arthur
(74) *Attorney, Agent, or Firm*—Devon A. Rolf

(57) ABSTRACT

A method and apparatus are provided for estimating an impedance through a node at an intersection between roads in a roadway network. The impedance may be measured in time or distance, for example. Characteristic information describes at least one feature of the intersecting roads. One or more pieces of characteristic information may impact the impedance of traffic through an intersection and are used to estimate the impedance through the node. Examples of characteristic information are speed information, road-type, network routing level, intersection angle information, one-way, and cross traffic turn information. An impedance factor, or a cost, is assigned to each piece of characteristic information. The cost may be positive if the characteristic information adds impedance to the node, or negative if the characteristic information subtracts impedance from the node.

18 Claims, 7 Drawing Sheets

SYSTEM AND METHOD FOR ESTIMATING IMPEDANCE TIME THROUGH A ROAD NETWORK

BACKGROUND OF THE INVENTION

Certain embodiments of the present invention relate to navigational route planning. In particular, certain embodiments of the present invention relate to determining a route through a road network.

Route planning devices are well known in the field of navigational instruments. Several algorithms utilized by planning devices calculate the route from one of the source and/or destination locations or from both simultaneously. Conventional planning algorithms operate based on a predefined stored data structure including data indicative of a geographic region containing the source and destination locations.

Some devices implement a straight line approach in determining the distance between source and destination locations. In the straight line approach, the processor creates a straight line from the present location to the final destination and measures that straight line distance. For example, if a desired destination is on a mountain, the straight line distance from a current location might be only six miles. However, if the only available road to that destination is a windy road around the mountain entailing 30 miles of actual driving, the route planning distance calculated by the straight line approach will be inaccurate.

Other devices implement a nodal analysis in which a number of potential paths are determined from a present location to a destination location based on stored data indicative of roadways between nodes. The nodal analysis then examines each potential path and determines an impedance or "cost" associated with each path (i.e. a measure of the amount of time or distance required to travel the path). Paths are eliminated based on criteria such as shortest distance, shortest time, lowest cost, or user inputted preferred routes.

However, conventional route planning devices will not find the most efficient route since they do not take into consideration certain factors that affect travel over a particular route. For example, a user may input desired source and destination locations, and request the route that covers the shortest distance. While only one particular route may be the physically shortest distance between source and destination locations, other near-shortest routes may exist that are only slightly longer. The shortest and near-shortest routes include travel along different combinations of roads and travel through unique combinations of road intersections. Each road in the shortest and near-shortest routes has an associated travel speed, representing the speed limit or range at which traffic typically travels over the road. Also, each road in the shortest and near-shortest routes passes through a combination of intersections. The shortest and near-shortest routes may be close in length, while the shortest route may include roads with slower travel speeds and/or more intersections and/or intersections that typically require more time (e.g., stop signs, stop lights, crossing larger/busier highways, turning across traffic onto a new road, etc.) as compared to one or more near-shortest routes.

Conventional route planning devices produce a shortest distance route which includes roads that are selected independent of whether the roads have slower traveling speeds. Conventional route planning devices do not include travel-time information for road intersections, nor account for delays at road intersections when planning a route. Although one route represents the shortest distance, a more efficient route may exist with a slightly longer distance (e.g., a near-shortest distance route). The difference between the length of the shortest distance route and the near-shortest distance route may be insignificant. Consequently, the user may travel for a longer period of time and encounter more traffic delays by taking the shortest distance route.

Conventional route planning devices do not take into consideration travel delays experienced at intersections, such as delays due to stop signs, stop lights, crossing lanes of on-coming traffic, turning onto or off of one-way roads, the angle at which roads intersect when a route turns from one road onto another, and the like. This is not desirable.

Thus, a need has long existed in the industry for a method and apparatus for determining impedance time through a road network that addresses the problems noted above and other problems previously experienced.

BRIEF SUMMARY OF THE INVENTION

Certain embodiments of the present invention relate to a method for estimating an impedance time through a node at an intersection between roads in a roadway network. The method includes identifying characteristic information that describes at least one feature of the intersecting roads. Based on the characteristic information, an impedance time associated with potential delays by traffic traveling through the node is estimated. The characteristic information may include speed information, such as speed categories or speed bands. A speed band identifies a speed range in which traffic travels on the road, and a speed differential between the speed bands of intersecting roads may be determined. Optionally, the characteristic information may include road-type or network routing level information, such as when the roadway network is divided into a hierarchy of road-types. A route level may be assigned to each road intersecting at a node, and a route level differential between the route levels of the roads may be determined. The characteristic information may include intersection angle information and/or cross traffic turn information.

In another embodiment of the present invention, a method is provided for calculating a navigation route between first and second geographic locations through a roadway network of roads that intersect at nodes. A data structure is provided that has data indicative of the roadway network of roads. The data includes feature data indicating traffic characteristics for the roads. Route impedance is calculated for a navigation route through the roadway between the first and second locations based on the feature data. The node impedance is determined for the navigation route where the navigation route intersects other roads. The node impedance may indicate a potential delay that traffic experiences when traveling through a node. The node impedance and route impedance are used to calculate the navigation route. The node and route impedances may be measured in time or distance.

The feature data may include speed information, one-way, and/or intersection angle information. A turn penalty may be assigned when the navigation route crosses on-coming traffic. Optionally, a neighborhood penalty may be added to the node or route impedance when the navigation route travels through residential areas that are not located at the first and second geographic locations. Optionally, an exit/entry ramp penalty may be added to the node or route impedance when the navigation route travels along an exit ramp from a first road directly onto an entry ramp back onto the first road.

In another embodiment of the present invention, a navigation device is provided comprising a memory and processor. The memory at least temporarily stores at least a portion of a data structure having data indicative of a roadway network of roads intersecting at nodes. The data structure includes feature data of traffic characteristics for roads. The processor accesses the memory and calculates a route through the roadway network between geographic locations from the data stored in the data structure. The processor estimates node impedances for intersection nodes, and utilizes the route impedance and node impedance to calculate the route. The feature data may include speed information, road-type information, routing level information, intersection angle information, and/or cross traffic information which is used to calculate node impedance. Optionally, the device may include an input buffer for temporarily storing a portion of the data structure received from an external storage device. In one embodiment, the device includes a display that presents the route to an operator. The device may also comprise a wireless input/output unit used to communicate with an external network and receive a portion of the data structure of a wireless connection with the external network.

In another embodiment of the present invention, a navigation system is provided comprising a storage unit, a route calculation module, and a correction module. The storage unit stores a data structure having data indicative of roads and intersection nodes in a roadway network. The data includes road-type information that classifies roads into a hierarchy of route levels. The route calculation module calculates a planned route between source-and destination locations over the network based on the stored data. The route calculation module may calculate the route based on a shortest distance routing algorithm, and may add a distance penalty to potential routes that include an exit or entrance ramp. The correction module identifies undesirable shortcuts by using the road-type information to avoid traveling from a road of a higher route level to a road of a lower route level. Undesirable shortcuts may be along exit and entrance ramps of a road or through neighborhoods. Optionally, the correction module may include a neighborhood progression module that updates the route to avoid residential roads that are remote from the source and destination locations.

The route calculation module may receive a request from a mobile unit over a network to calculate a route. The request would include source and destination locations, and other use specific information. The route calculation module would access corresponding data structures, such as in a server, plan the route, and return the planned route to the mobile unit. The returned information would include the portion of the roadway network between the source and destination locations. The network may be the internet, a wireless connection and the like.

Figure 2:
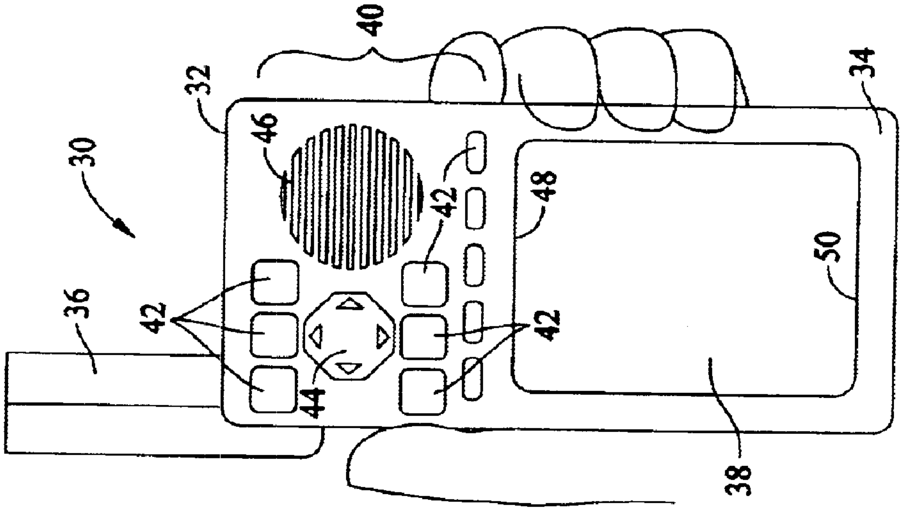
FIG. 2 illustrates a front view of a navigation device formed in accordance with an embodiment of the present invention.

The foregoing summary, as well as the following detailed description of the preferred embodiments of the present invention, will be better understood when read in conjunction with the appended drawings. For the purpose of illustrating the invention, there is shown in the drawings, embodiments which are presently preferred. It should be understood, however, that the present invention is not limited to the precise arrangements and instrumentality shown in the attached drawings.

DETAILED DESCRIPTION OF THE INVENTION

Figure 1:
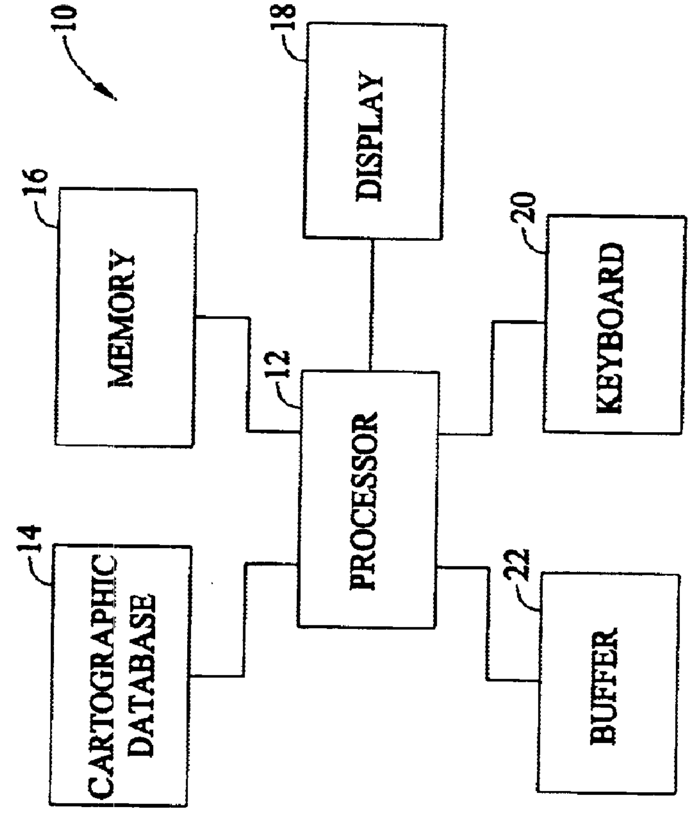
FIG. 1 illustrates a block diagram of a navigation device formed in accordance with an embodiment of the present invention.

FIG. 1 illustrates a system 10 formed in accordance with an embodiment of the present invention. The system 10 includes at least one processor 12 for carrying out various processing operations discussed below in more detail. The processor 12 is connected to a cartographic database 14, memory 16, a display 18, a keyboard 20, and a buffer 22. Optionally, more than one processor 12 may be included. The cartographic database 14 may store data indicative of a roadway network (in full or in part) used in connection with embodiments of the present invention. The memory 16, while illustrated as a single block, may comprise multiple discrete memory locations and/or discs for storing various types of routines and data utilized and/or generated by embodiments of the present invention. The buffer 22 represents a memory storage area that may be within memory 16 or separate therefrom. Buffer 22 is used to temporarily store data and/or routines used in connection with embodiments of the present invention. The display 18 displays information to the user in an audio and/or video format. The keyboard 20 permits the user to input information, instructions and the like to the processor 12 during operation.

By way of example only, initial operations may be carried out by an operator of the system 10, utilizing the keyboard 20 for controlling the processor 12 in the selection of parameters, defining data structures to be developed and/or accessed, and the like.

The data structure(s) stored in the cartographic database 14, memory 16, and/or buffer 22 may include data indicative of features associated with a roadway network and/or a geographic area. The data may represent points, lines, areas, coordinates (longitude, latitude and altitude), or otherwise. For instance, portions of a highway, river or boundary (e.g., a state or country boundary), trails and the like may be represented by linear features stored in the data structure. In addition, cities, towns, neighborhoods, communities and the like may be represented by point features within the data structure. Also, buildings, lakes, and the like may be represented by area features. Prior to storage, various common features may be identified for cartographic data and such common features may be classified based upon predefined hierarchies. For example, interstate highways may be defined and/or organized as one feature class, state highways and roads may be defined as a second feature class, and county roads may be defined as a third feature class. Features other than roads, such as rivers and waterways, may also be classified. As a further example, geographic boundaries (e.g., state and county lines) may be assigned one or more different feature classes.

FIG. 2 illustrates a portable electronic device 30 formed in accordance with an embodiment of the present invention. The electronic device 30 is oriented along a vertical axis (as illustrated) or horizontal axis when held by a user. The portable electronic device 30 includes a housing 32 having a face plate 34 and sidewalls and a back wall (not shown). The portable electronic device 30 further includes an antenna 36 mounted at one corner of the housing 32. The face plate 34 is substantially rectangular in shape. The face plate 34 securely frames the display screen 38 and houses the control panel 40. The control panel 40 includes several push button-type keys 42 that afford the user control over the portable electronic device 30.

Optionally, a directional toggle pad 44 may be included within the control panel 40. In one application, such as when utilizing the portable electronic device 30 within a global positioning system, the toggle pad 44 affords the ability to scan through a large map of a geographic area, all or a portion of which is stored in memory of the portable electronic device 30. The portable electronic device 30 then displays portions of the scanned map on the display screen 38. The display screen 38 also illustrates planned routes through geographic areas between source and destination locations. Optionally, the control panel 40 may include a speaker/microphone combination, designated by reference numeral 46, to afford communication between the operator and a remote destination.

The display screen 38 may be located below the control panel 40 (when oriented along a vertical axis) to afford easy data entry by the user. When vertically oriented, the display screen 38 is controlled to orient data upon the display screen 38 such that side 48 of the display screen 38 represents the top of the data to be displayed, while side 50 of the display screen 38 represents the bottom. Thus, the data is preferably displayed from the top 48 to the bottom 50 of the display screen 38.

Figure 3:
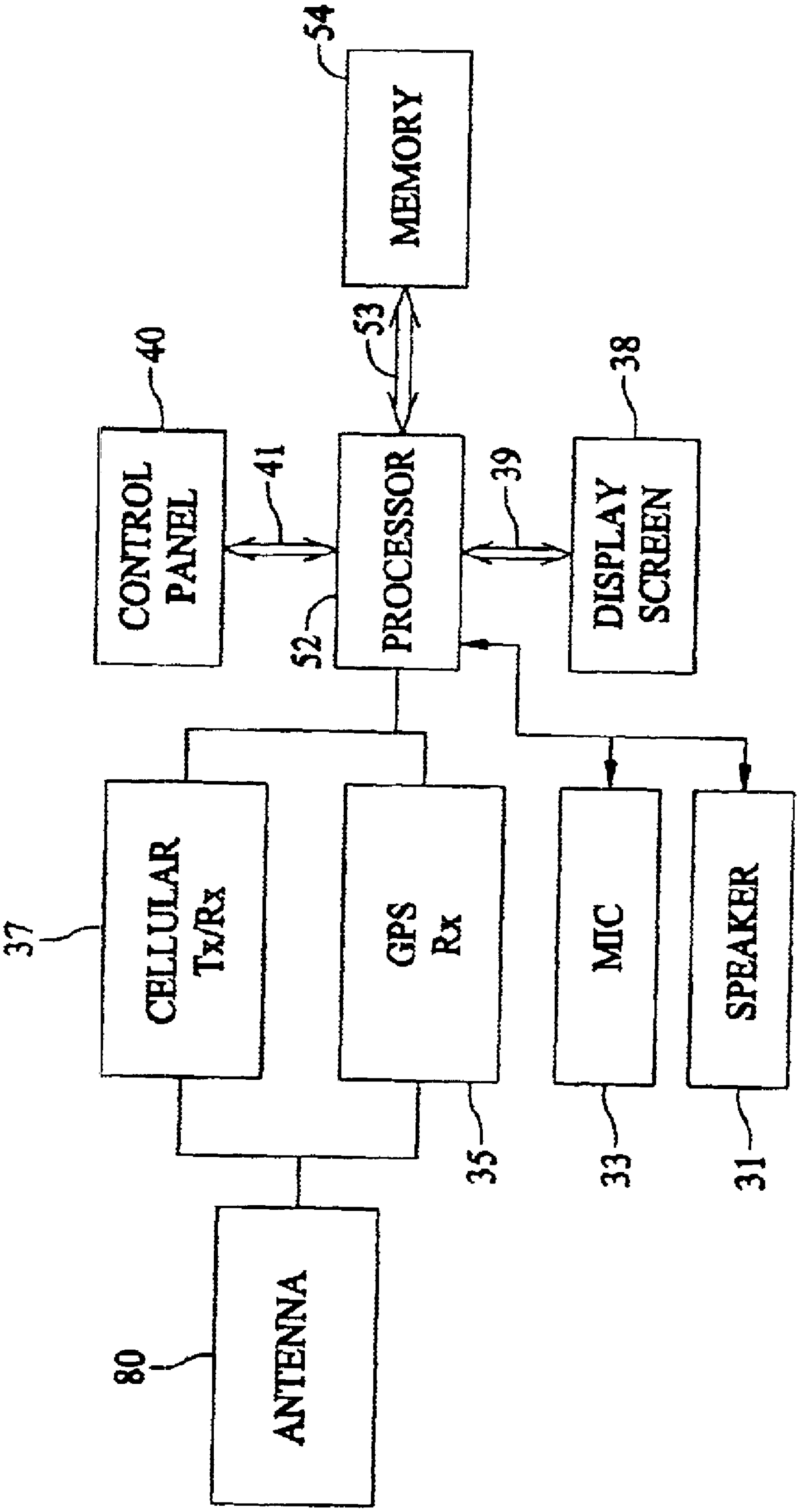
FIG. 3 illustrates a block diagram of a navigation device formed in accordance with an embodiment of the present invention.

FIG. 3 illustrates a block diagram for an electronic circuit of the portable electronic device 30 formed in accordance with an embodiment of the present invention. The electronic circuit includes a processor 52 that communicates via the control panel 40 through line 41. The processor 52 communicates via line 39 with the display screen 38. The electronic circuit further includes a memory 54 that is accessed by the processor 52 via line 53. The antenna 36 is connected to the processor 52 via a cellular transmitter/receiver 37 and a GPS receiver 35. The electronic circuitry of the portable electronic device 30 is powered by a power supply (not shown) housed within the device or connected thereto. A microphone 33 and a speaker 31 are also connected to, and communicate with, the processor 52.

The housing 32 of the portable electronic device 30 houses the processor 52, memory 54, display 38 and key pad 40. The display screen 38 and control panel 40 are accessible at the exterior of the housing. In one embodiment, the portable electronic device 30 is utilized in conjunction with a global positioning system for acquiring signals transmitted from satellites in geosynchronous orbit. In such an embodiment, the processor 52 includes means for calculating, by triangulation, the position of the portable electronic device 30. In such an embodiment, an image file indicative of a selected map is held in memory 54. In accordance with one embodiment, the image file held in memory 54 comprises spatial data indices according to a data structure defining a geographic area of interest.

An operator of the portable electronic device 30 controls the processor 52 through use of control panel 40 to display map images on the display screen 38. Utilizing the control panel 40, the operator selects various zoom levels, corresponding to layers of the data structure for a particular geographic region desired to be displayed on the display screen 38. Data indicative of the map to be displayed is accessed from the memory 54 according to the inputs by the user using the control panel 40. When performing a route planning operation, the operator enters a source location and a destination location, such as by entering addresses, geographic coordinates, well-known buildings or sites, and the like. The processor 52 accesses data structures stored in memory 54 to calculate a suggested route.

Figure 4:
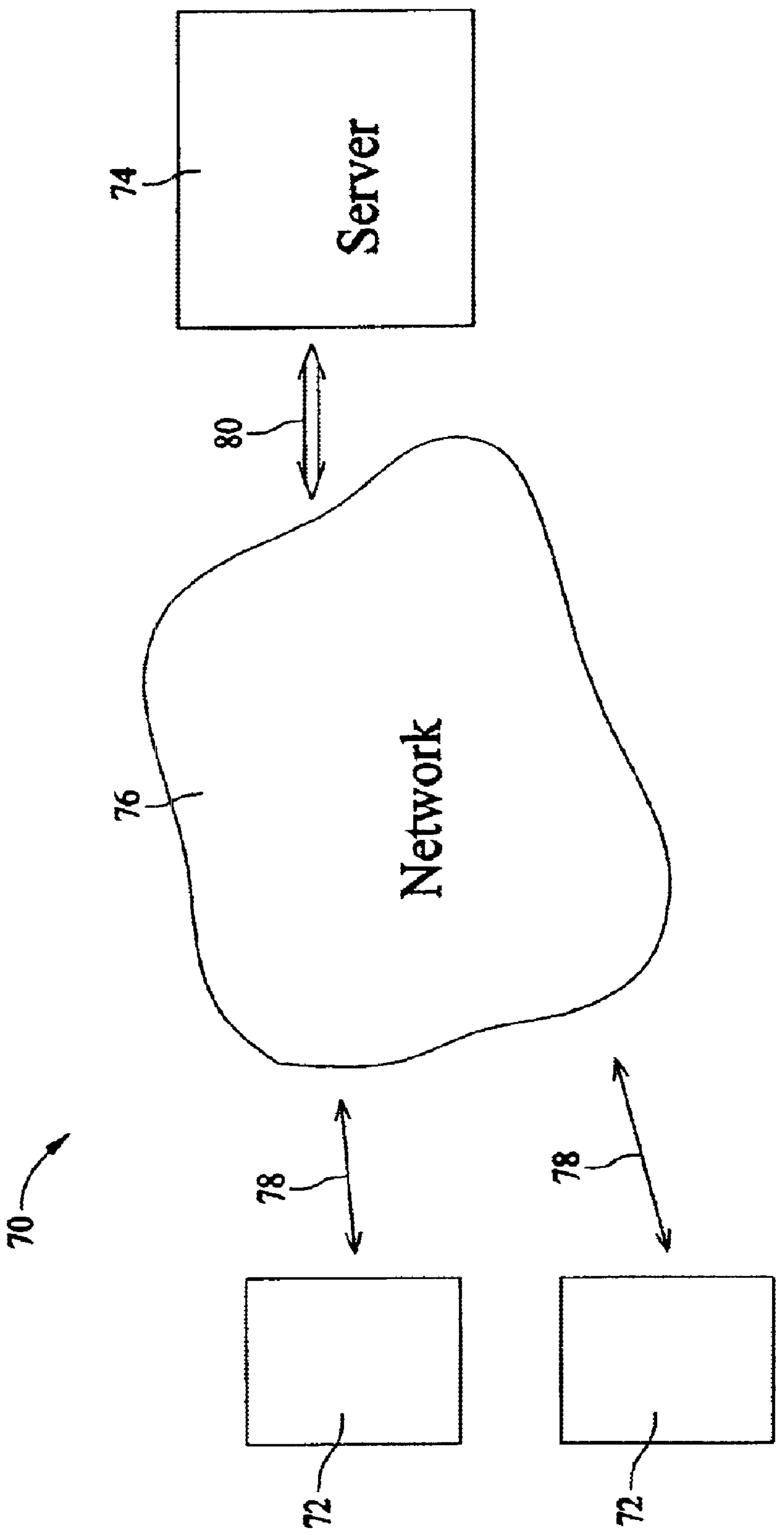
FIG. 4 illustrates a navigation system formed in accordance with an embodiment of the present invention.

FIG. 4 illustrates a navigation and routing system 70 formed in accordance with an alternative embodiment of the present invention. The system 70 includes one or more mobile units 72 capable of performing navigation and/or routing functions, a server 74 and an intervening network 76. The mobile units 72 may each include some or all of the structure and/or functionality of the portable electronic device 30. The server 74 may perform a majority of the navigation and route planning operations and transmit results and limited geographic data to the mobile units 72. Alternatively, the server 74 may simply perform minor management operations. The server 74 communicates with the mobile units 72 through communications links 78 and 80 and the network 76 which may constitute the internet, a wireless communications network supported by ground-based towers and/or satellites, and the like. The mobile units 72 may receive data structures, coordinate information, and the like over communications links 78 and 80 from the network 76.

During operation, the server 76 may simply transmit data structures for requested geographic regions to the mobile units 72, after which the mobile units 72 carry out all necessary processing to perform navigation and routing operations. Alternatively, the mobile unit 72 need not store the data structures. Instead, the server 74 may maintain the data structures and carry out navigation and routing calculations based upon requests received from the mobile unit 72. For example, the user may enter source and destination locations for a desired routing operation. The source and destination coordinates are transmitted from the mobile unit 72 through the communications links 78 and 80 and network 76 to the server 74 which calculates the desired route and returns such information to the mobile unit 72. In this alternative embodiment, the mobile unit 72 need not store large cartographic data blocks or data structures that would otherwise be needed to calculate and plan a route.

Figure 5:
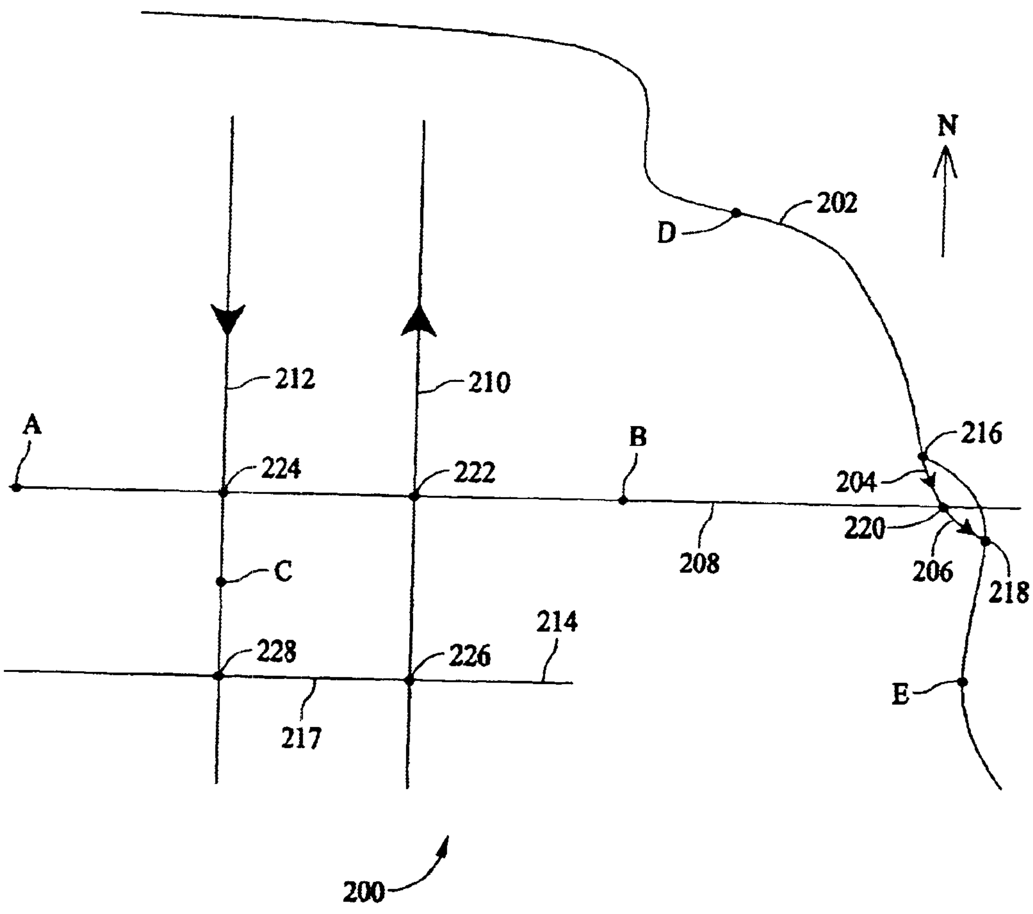
FIG. 5 illustrates a roadway network formed in accordance with an embodiment of the present invention.

FIG. 5 illustrates a portion of a data structure containing data indicative of a roadway network 200 formed in accordance with an embodiment of the present invention. The portion of the roadway network 200 includes roads 202–214. The roadway network 200 includes multiple types of roads, such as interstate highways, state highways, country roads, and residential streets. The roads 202–214 intersect at intersection nodes 216–228. A segment is a portion of a road 202–214 that is between two nodes 216–228. Nodes at either end of a segment are adjacent. For example, segment 217 is a portion of road 214 and is between node 226 and node 228, thus nodes 226 and 228 are adjacent to one another. The terms “adjacent nodes” or simply “adjacencies” shall be used throughout to refer nodes that are adjacent to one another.

FIG. 5 sets forth points A–E within the roadway network 200. Exemplary route planning operations carried out by certain embodiments of the present invention will be described below in connection with roads 216–228 and points A–E.

The system 10 of FIG. 1, the portable electronic device 30 of FIG. 2 or the network of FIG. 4 may be utilized to generate a route from a first location to a second location within the roadway network 200. The processor 12 utilizes the data stored in the cartographic database 14 and data input by the user through the keyboard 20 to calculate the requested route. Optionally, the user may enter a time of day or day of the week in which the user wishes to travel. In this alternative embodiment, the device 30 uses the time at which the user desires to travel to access different characteristic information for a particular road, to account for times of day in which a road or intersection is very busy. Although the remaining Figures are discussed in relation to system 10, it should be understood that the device 30 and network 76 may also be used to perform similar functions.

Travel through the roadway network 200 is described in terms of distance, time or user preferences (e.g., scenic routes, routes through/around business districts, routes through/around downtown areas and the like). The distances, times and user preferences are generally referred to as "impedances." Route planning devices calculate shortest distances and fastest times, and maximize user preferences by calculating impedances for various routes based on characteristic information describing features of the roadway network.

As previously discussed, some cartographic data may be classified based upon predefined hierarchies. For data such as roads, the hierarchy may be divided into network routing levels which are stored as characteristic data for an associated road. The roads most desirable to use for routing may be assigned to a relatively high network routing level, while roads least desirable to use for routing may be assigned to a relatively low network routing level. For example, if road 202 is an interstate highway and road 214 is a residential road, road 202 would have a higher network routing level than road 214 because road 202 is a more desirable road for routing when considering factors such as speed limit, number of lanes, and number of stop lights/signs.

Cartographic data for individual roads may also include characteristic information representative of speed data. The speed data may be organized into speed categories describing a range of traveling speeds, or speed bands. Each speed band represents a range of speed, such as 0–10 miles per hour (mph) or 11–20 mph, in which traffic generally travels over a given road.

Optionally, a particular road may be assigned one speed band for certain times of day (e.g., non-rush hour) and assigned a second speed band for other times of day (e.g., rush hour). To utilize different speed bands for a particular road, the user also enters the time of day that the user wishes to travel. In this instance, the route planning device takes into consideration the time of day for traveling (if known) and selects the corresponding speed band.

The characteristic information may also identify whether the road is a one-way road. In FIG. 5, roads 210 and 212 are one-way roads allowing travel in opposite directions, as indicated by the arrows, while roads 208 and 214 allow travel in both directions. One-way roads impact traffic by increasing or decreasing the time necessary for travel along the road and the time generally needed to pass through an intersection node (e.g., turn onto a one-way road, turn off of a one-way road, or cross a one-way road). To compensate for the impact on overall travel time, an impedance increment is either added to or subtracted from the impedance estimate, as further described below. The impedance increment constitutes a time (e.g., seconds or minutes) when calculating a travel time. The impedance increment constitutes a distance (e.g., feet or meters) when calculating a travel distance.

Figure 6:
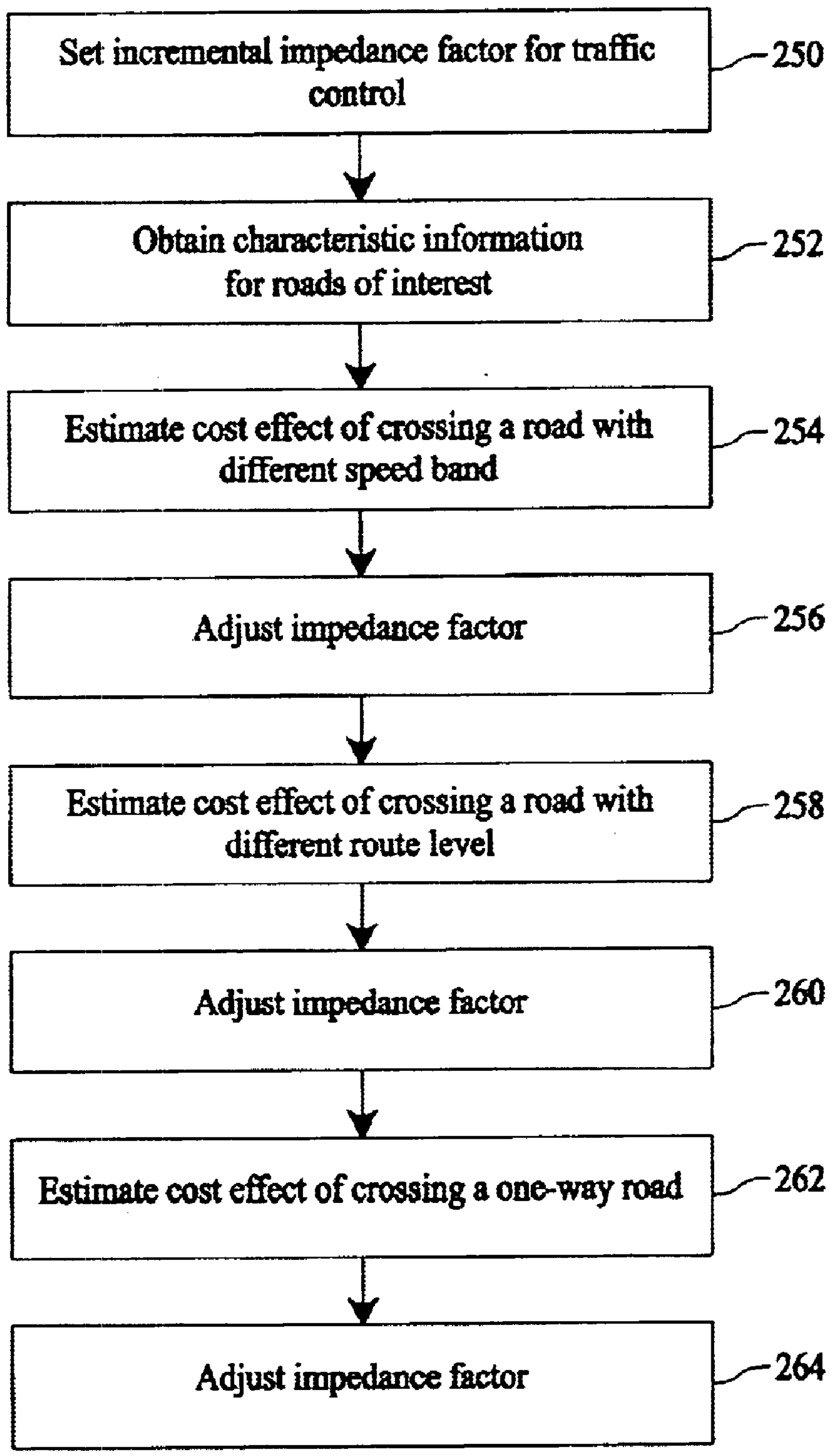
FIG. 6 illustrates a flow chart of a method for estimating the impedance time through an intersection node in accordance with an embodiment of the present invention.
Figure 7:
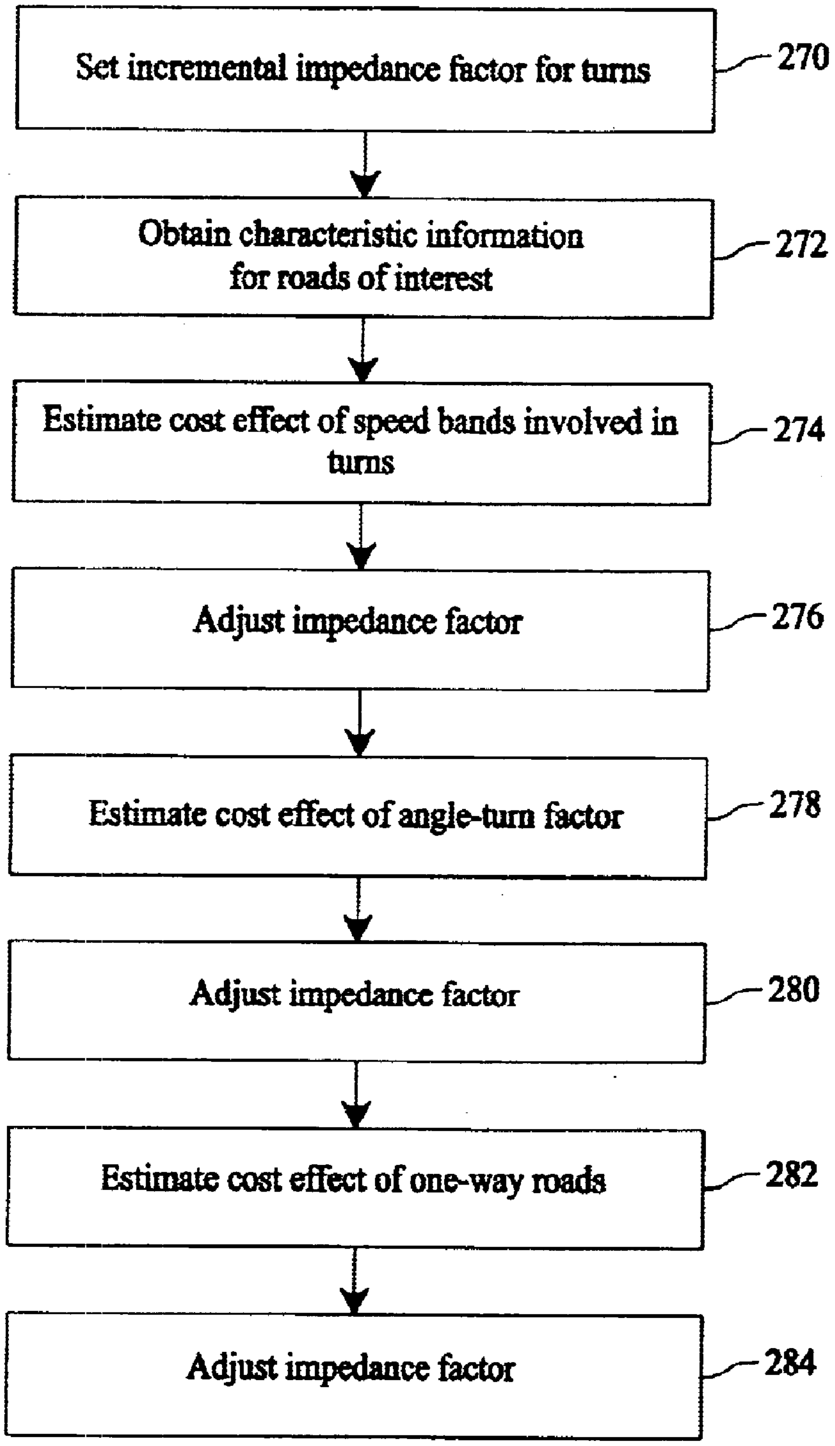
FIG. 7 illustrates a flow chart of a method for estimating turn penalties in accordance with an embodiment of the present invention.
Figure 8:
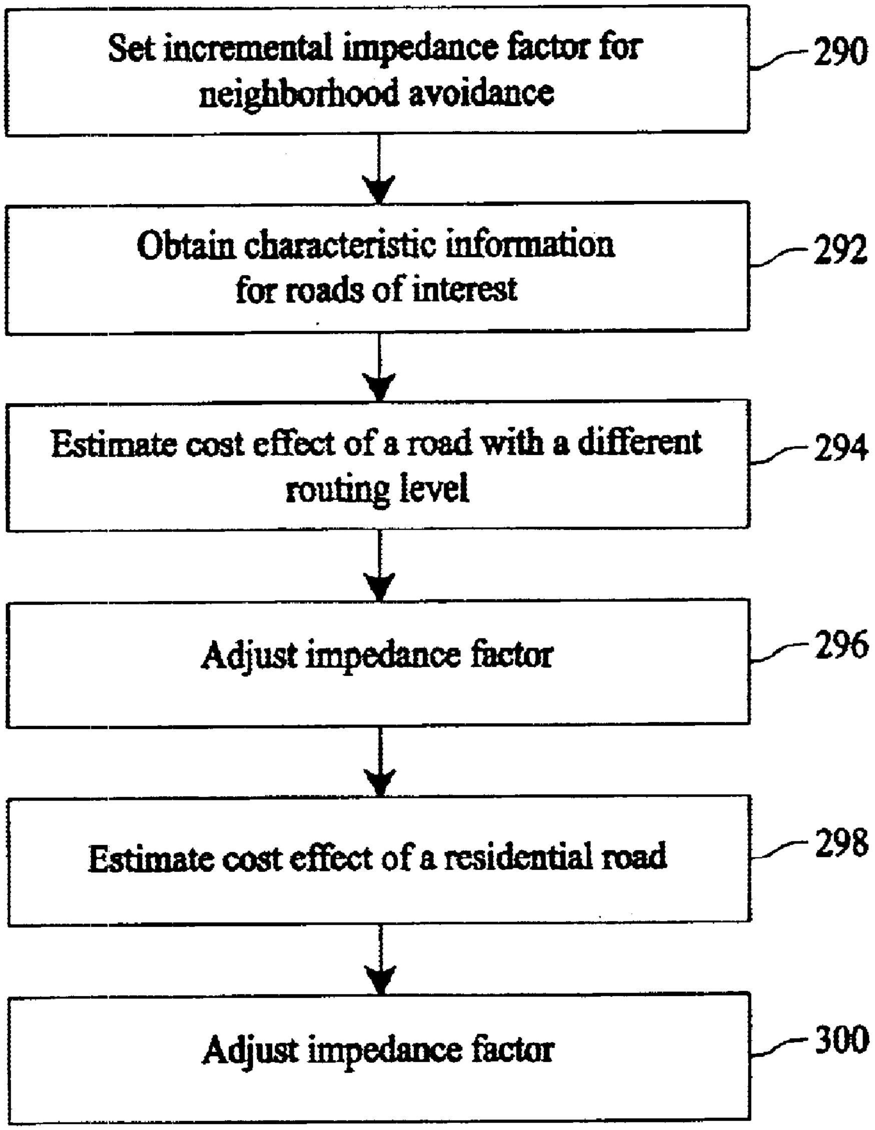
FIG. 8 illustrates a flow chart of a method for improving shortest distance routes in accordance with an embodiment of the present invention.

FIGS. 6, 7, and 8 illustrate exemplary methods for determining three distinct components which may contribute to the estimated impedance value through a node of a navigable roadway network. FIG. 6 illustrates a method for estimating impedance factors due to speed band and route level changes experienced by a path through an intersection. FIG. 7 illustrates a method for establishing impedance factors associated with a turn that is to be made through an intersection. FIG. 8 illustrates a method for applying additional impedance values through a node to discourage a route from being planned through certain portions of the roadway network, as disclosed below. These components can be applied singly, or in combination, and have the effect of producing superior routes when compared to conventional routing algorithms.

The processing steps illustrated by FIGS. 6–8 are part of a larger route planning algorithm, conventionally implemented as one of a collection of methods generally known as Greedy algorithms. One such algorithm is the A* algorithm, but other algorithms may be used. The algorithm may calculate the route in one direction (e.g. from the source to the destination) or bi-directionally (e.g. from both the source and destination).

By way of example only, one method may involve an iterative process in which a list of nodes to be explored is continuously analyzed and updated. The list represents a running list of nodes to be explored. The process includes selecting, from the list, a best node (e.g., a node having the least cost associated with it). The selected best node is analyzed to identify its adjacency information, namely one or more nodes adjacent to the best node. The newly identified adjacent nodes are added to the list of nodes to be explored. Then the costs associated with the newly added nodes are calculated, and the list is searched to identify a new best node (e.g., new lowest cost node). The cost assigned to a node may include several factors, such as a cost from the originating location of a search to the node and an estimate of cost from the node to a final search location.

Finding a low-cost path between two points in the network with such methods involves iteratively examining the adjacencies emanating from the source and destination in the network, eventually "discovering" a low-cost path. Adjacencies represent adjacent nodes directly connected to a given node through road segments without any intervening intersections. During the adjacency expansion step for a given node, these algorithms evaluate the cost or impedance to traverse from one adjacent node through the given node, to another adjacent node. This step evaluates all appropriate adjacency information for each "best node" in sequence. During the evaluation of each best node, the operations set forth in FIGS. 6–8 are applied to emulate the real-world traversal cost experienced when passing through a given intersection node from one adjacent road to another. A separate traversal cost or impedance as disclosed below may be calculated for each possible path through the intersection from adjacent roadways. As noted above, cost or impedance values may be expressed in terms of time, distance, or other suitable metric, and may be tailored to the needs of a specific implementation or embodiment. For example, a user may input data requesting the fastest or shortest route.

FIG. 6 illustrates a flow chart of a method for estimating the impedance through an intersection node of a navigable network in accordance with an embodiment of the present invention. As previously discussed, FIG. 6 may be repeated for each adjacency.

At step 250, a base incremental impedance factor for traffic control is set. The impedance factor may be determined by the processor, or may be input using the keyboard 20. The impedance factor may be any positive number, and determines the base cost of traversing through a given node from one adjacent node to another, effectively applying a cost penalty for going through a given road network intersection. For example, the impedance may be expressed in units of time, such as seconds, but the selected units and value associated with this base impedance may vary according to the goals of a particular implementation. The base incremental impedance is further modified as described below.

Next, at Step 252, the processor 12 obtains characteristic information for the roads of interest from the cartographic database 14. The roads of interest represent the roads presently being considered by the overall route planning algorithm. The characteristic information may include speed information, network routing levels, one-way road information, left and right turn information, angle of intersection information between roads, road-type information, and the like. The characteristic information may include such data as whether the road is residential or in a neighborhood. Certain characteristic information is stored in the data structure for the associated roadway network. Other characteristic information is generated during a route calculation process by the overall route planning algorithm. For example, the overall route planning algorithm identifies right and left turn information, namely whether a potential route includes right or left turns at a particular intersection.

At steps 254 and 258, the processor 12 emulates the effect of stop lights, stop signs, and other common traffic control items not conventionally provided as part of the cartographic database. For a potential path through a given node (an inbound road and outbound road through the intersection), the processor 12 utilizes information about the relative difference in speed band and routing level of the specified adjacency pair to adjust the base incremental impedance factor of step 250.

At step 254, the processor 12 estimates the relative cost effect of crossing roads with differing speed bands, emulating the cost of crossing roads with higher or lower speeds. Each road in the cartographic database 14 may be assigned a speed band. For a given adjacency path through the intersection, the processor 12 identifies the maximum speed band to be crossed, and compares this to the speed band of the inbound adjacent road. For example, with reference to FIG. 5, if road 208 has been assigned a speed band of 21–30 and road 212 has been assigned a speed band of 41–54, there typically will be an impedance cost increase associated with passing through node 224 along road 208, because the adjacency must cross the higher-speed road 212. The magnitude of the modification applied to the base impedance, and the nature of the modification may be tailored in a specific implementation, and may depend on the number and nature of the speed information provided in the cartographic database, and/or the relative speed band differences between roads.

At step 256, the processor 12 increases the incremental impedance factor established at step 250 if the selected adjacency crosses a road with a greater speed band. If the selected adjacency crosses a road with a lesser speed band, the processor 12 decreases the incremental impedance factor.

At step 258, the processor 12 estimates the relative cost effect of crossing roads with differing route levels. As explained previously, the roadway network may be arranged in a hierarchy of routing levels where roadway segments at a higher routing level provide preferable pathways through a given region than those assigned to a lower routing level. For example, it is likely that an adjacency path along a low route level road that must cross a higher route level road will experience impedance costs due to the presence of a traffic control structure such as a stop sign. When a higher route level road crosses a lower route level road, there is a lessened probability that a significant impedance cost will be encountered.

At step 260, the processor 12 increases the incremental impedance factor if the selected adjacency crosses a road with a greater route level. If the selected adjacency crosses a road with a lower route level, the processor 12 decreases the incremental impedance factor. The magnitude of the modification applied and the nature of the modification may be tailored in a specific implementation, and may depend on the number and nature of the route levels provided in the cartographic database, and/or the relative route level differences between roads.

At step 262, the processor 12 adjusts the estimated cost of the potential path by a percentage of the impedance factor based on one-way road characteristic information. The estimated cost of crossing a one-way road at a node is weighted less because the traffic is moving in only one direction, thus the driver crossing a one-way road needs to monitor traffic in only one direction. The processor 12 determines whether the road being crossed at the node is a one-way road. In the example above, road 212 is a one-way road, thus the estimated cost of the potential path is reduced by a percentage of the impedance factor.

Next, at step 264, the processor 12 increases the impedance factor if the road being crossed is not a one-way road, and decreases the impedance factor if the road being crossed is a one-way road. The processor 12 may then use the impedance factor of step 264 to adjust the estimated overall cost of a potential path.

FIG. 7 illustrates a flow chart of a method for estimating turn penalties in accordance with an embodiment of the present invention. The sequence set forth in FIG. 7 is carried out as part of an overall route planning algorithm as explained previously for FIG. 6, and may be repeated for each adjacency.

At step 270, an incremental base impedance factor for turns is set. As with the base impedance factor set in step 250 in FIG. 6, the base impedance factor of step 270 may be determined by the processor 12 or may be input using the keyboard 20. The base impedance factor of step 270 may or may not be the same value utilized in step 250. If the potential path does not include a turn, the method of FIG. 7 may not apply for the adjacency.

At step 272, the processor 12 obtains the characteristic information for the roads of interest from the cartographic database 14 and from the overall route planning algorithm. The characteristic information includes the left and right turn information, angle-of-intersection information, road-type, and speed information. The left and right turn information identify whether an adjacency path through a node presently considered includes a right turn or a left turn at the intersection node. Additional characteristic information that may be considered is whether the driver is driving on the left or the right side of the road, as determined by driving convention for the region.

At step 274, the processor 12 estimates one component of the relative cost effect of performing a turn at the intersection node by considering the speed bands of the adjacent roadway segments involved in the turn. At this step, a turn involving very low-speed roads would typically apply a small increase to the base impedance factor established at step 270, whereas a turn involving high-speed roads would typically apply a larger increase to the base impedance factor of step 270. This has the effect of increasing the overall turn cost as the average speeds of the adjacent roads goes up.

Next, at step 276, the processor 12 increases the incremental impedance factor a small amount if the turn involves low-speed roads. It the turn involves high-speed roads, the processor 12 increases the incremental impedance factor a larger amount.

At step 278, the processor 12 estimates the cost of the route based on the angle-turn factor. The angle-turn factor may be assigned based on several components. One component is the size of the turn angle, which is measured relative to the direction of travel. The turn angle may be divided into bands of degrees, with the number of degrees in each band depending upon the desired level of courseness in the data. For example, turn angles may be divided into 45 degree bands. Hence, a turn that is 5 degrees would be weighted the same as a turn that is 40 degrees. A turn that is 90 degrees, however, would be weighted differently than a 40 degree turn. For example, a 90 degree turn may be more "expensive", or have a higher cost, than a 40 degree turn. Turns greater than 90 degrees get progressively more expensive, with a U-turn (180 degrees), being the costliest.

Another component of the angle-turn factor is the side of the road the driver is driving on relative to the turn direction. Driving side will be discussed first in relation to the country the route is located in. For example, in the United States, drivers travel in the right hand lane in the direction of travel. In England, however, drivers travel in the left hand lane in the direction of travel. The processor 12 identifies the lane convention in the country of travel, and adjusts the angle-turn factor based upon the direction of the turn. If it is necessary to cross a lane of on-coming traffic to make a turn, the turn is more expensive. Therefore, a left turn in England, which is made from the left lane of the first road into the left lane of the second road, is less expensive than a left turn in the United States, which is made from the right lane of the first road, across at least one lane of on-coming traffic, into the right lane of the second road.

The reasons stated above in relation to the country also apply when the road of travel is a one-way road. For example, a left turn in the United States made from the left lane of a one-way road is less expensive than a left turn made from the right lane of a two-way road, because oncoming traffic is not present on the one-way road.

At step 280, the processor 12 increases the incremental impedance factor based on the angle-turn factor. At step 282, the processor estimates the cost of the possible path based on one-way road information. Step 282 is similar to Step 262 of FIG. 6, wherein a percentage of the impedance factor set in Step 270 is used to decrease the impedance factor if the driver is turning onto a one-way road. Therefore, in the example of FIGS. 7 and 5, the estimate of the turn at node 224 from road 208 onto road 212 may be decreased to reflect that road 212 is a one-way road.

At step 284, the processor 12 decreases the incremental impedance factor if the driver is turning from and/or onto a one-way road. The processor 12 may use the impedance factor of step 284 to adjust the estimated overall cost of the potential path.

FIG. 8 illustrates a flow chart of a method for improving shortest distance routes in accordance with an embodiment of the present invention. When choosing the shortest distance route between 2 points, it is possible that the shortest distance route will include undesirable shortcuts, such as traveling through a neighborhood when the neighborhood is not the destination or the point of origin, or taking the exit and entry ramps of an interstate highway rather than remaining on the highway. In addition, traveling through a neighborhood may increase overall travel time if the route is not significantly shorter than driving around the neighborhood on a road with a higher network routing level. The sequence set forth in FIG. 8 is carried out as part of an overall route planning algorithm.

At Step 290, an incremental impedance factor for neighborhoods is set. As the method is used to improve the shortest distance route, the impedance factor of step 290 is measured in distance. Therefore, the incremental impedance factor of step 290 may or may not have the same value and may or may not be defined by the same unit of measure as the impedance factors defined in steps 250 and 270, and may be tailored to the implementation as needed.

Next, at step 292, the processor 12 obtains characteristic information for the roads of interest from the cartographic database 14. Although other characteristic information may be obtained and used by the processor 12 for other purposes, the network routing level and road-type information is used by the method illustrated in FIG. 8.

At step 294, the processor 12 estimates the cost of the possible path based on routing level information. The processor 12 compares the network routing level of the roads intersecting at each node. Referring to FIG. 5, if a route is planned from point D to point B, the processor 12 will compare the network routing levels of the roads at nodes 216 and 220. Traveling from point D, the road 202 is an interstate highway and may have a network routing level of 5. Road 204 is an exit ramp and may have a network routing level of 3.

Next, at step 296, the processor 12 increases the impedance factor for traveling through a node from a road with a higher network routing level to a road with a lower network routing level. Continuing with the above example, because the network routing level of an exit ramp is lower than that of an interstate highway, the processor 12 increases the incremental impedance factor set in step 290.

If, however, a route was planned from point D to point E, it is not advantageous to exit and immediately re-enter an interstate highway to save a short distance. Increasing the incremental impedance factor in step 296 for taking the exit ramp (road 204) at node 216 may prevent the processor 12 from directing the driver off the interstate highway (road 202) at node 216 and back onto the interstate highway (road 202) via the entry ramp (road 206), even if the combined distance of the entry ramp and the exit ramp is less than the distance traveled by remaining on road 202.

At step 298, the processor 12 estimates the cost of the possible path based on neighborhood, or residential, road information. For example, a distance penalty is added for traveling on road segments located in neighborhoods. The distance penalty may be a percentage of the length of the segment (i.e. the road between each node) such as 5%. Adding a penalty of 5% will tend to prevent the processor 12 from planning a shortest distance route through a neighborhood when the neighborhood is not the origin or the destination. The penalty of 5%, however, is not a large enough penalty to prevent the route from traveling through the neighborhood if the neighborhood route is significantly shorter than traveling on roads with higher network routing levels that avoid the neighborhood.

At step 300, the processor 12 increases the incremental impedance factor if the path travels through a neighborhood by adding a distance penalty, as discussed previously. The processor 12 may then use the impedance factor of step 300 to adjust the estimated overall cost of the potential path.

Correction modules that include one or more of the sets of steps for estimating impedance time, estimating turn penalties, and/or improving shortest distance routes by eliminating undesirable shortcuts, such as through neighborhoods, may be utilized by conventional planning algorithms and route planning systems. By using the aforementioned techniques for calculating the estimated delays that are experienced by traffic moving through a node, a more desirable route is planned.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for estimating an impedance time through a node at an intersection between roads in a roadway network, comprising:

identifying characteristic information for roads intersecting at a node in a roadway network, said characteristic information describing at least one feature concerning an associated road; and estimating an impedance time associated with potential delays by traffic traveling through the node based on the characteristic information for the roads intersecting at the node, wherein said identifying step comprises obtaining intersection angle information identifying an angle between the roads intersecting at the node, said intersection angle information representing at least a portion of the characteristic information.

2. A method for estimating an impedance time through a node at an intersection between roads in a roadway network, comprising:

identifying characteristic information for roads intersecting at a node in a roadway network, said characteristic information describing at least one feature concerning an associated road; and estimating an impedance time associated with potential delays by traffic traveling through the node based on the characteristic information for the roads intersecting at the node, wherein said identifying step comprises obtaining cross traffic turn information identifying whether a desired route through the node crosses oncoming traffic, said cross traffic turn information representing at least a portion of the characteristic information.

3. A method for calculating a navigation route between first and second geographic locations through a roadway network of roads intersecting at nodes, comprising:

providing a data structure having data indicative of a roadway network of roads intersecting at intersection nodes, said data including feature data indicative of traffic characteristics for associated roads;

calculating a route impedance for navigation route through said roadway network between first and second geographic locations based on said feature data;

determining node impedances for intersection nodes though which the navigation route travels based on said feature data, said intersection nodes representing locations along the navigation route at which roads followed by the navigation route intersect other roads; and utilizing said node impedance and route impedance to calculate the navigation route, wherein said determining step includes obtaining intersection angle information identifying an angle between roads meeting at the intersection node, said node impedance being determined based at least partially on said intersection angle information.

4. A method for calculating a navigation route between first and second geographic locations through a roadway network of roads intersecting at nodes, comprising:

providing a data structure having data indicative of a roadway network of roads intersecting at intersection nodes, said data including feature data indicative of traffic characteristics for associated roads;

calculating a route impedance for a navigation route through said roadway network between first and second geographic locations based on said feature data;

determining node impedances for intersection nodes though which the navigation route travels based on said feature data, said intersection nodes representing locations along the navigation route at which roads followed by the navigation route intersect other roads; and utilizing said node impedance and route impedance to calculate the navigation route, wherein said determining step includes obtaining cross traffic turn information identifying whether the navigation route crosses on-coming traffic when passing through an associated intersection node, said node impedance being determined based at least partially on said cross traffic turn information.

5. A method for calculating a navigation route between first and second geographic locations through a roadway network of roads intersection at nodes, comprising:

providing a data structure having data indicative of a roadway network of roads intersecting at intersection nodes, said data including feature data indicative of traffic characteristics for associated roads;

calculating a route impedance for a navigation route through said roadway network between first and second geographic locations based on said feature data;

determining node impedances for intersection nodes through which the navigation route travels based on said feature data, said intersection nodes representing locations along the navigation route at which roads followed by the navigation route intersect other roads; and utilizing said node impedance and route impedance to calculate the navigation route, wherein said determining step includes assigning a turn penalty to the node impedance when the navigation route crosses on-coming traffic when passing through a corresponding intersection node.

6. A method for calculating a navigation route between first and second geographic locations through a roadway network of roads intersecting at nodes, comprising:

providing a data structure having data indicative of a roadway network of roads intersecting at intersection nodes, said data including feature data indicative of traffic characteristics for associated roads;

calculating a route impedance for a navigation route through said roadway network between first and second geographic locations based on said feature data;

determining node impedances for intersection nodes though which the navigation route travels based on said feature data, said intersection nodes representing locations along the navigation route at which roads followed by the navigation route intersect other roads;

identifying when the navigation route travels through neighborhood roads in a residential geographic area remote from said first and second geographic locations;

including a neighborhood penalty with one of said route and node impedances based on said identification step; and utilizing said node impedance and route impedance to calculate the navigation route.

7. A method for calculating a navigation route between first and second geographic locations through a roadway network of roads intersecting at nodes, comprising:

providing a data structure having data indicative of a roadway network of roads intersecting at intersection nodes, said data including feature data indicative of traffic characteristics for associated roads;

calculating a route impedance for a navigation route through said roadway network between first and second geographic locations based on said feature data;

determining node impedances for intersection nodes though which the navigation route travels based on said feature data, said intersection nodes representing locations along the navigation route at which roads followed by the navigation route intersect other roads;

including a neighborhood penalty with one of said route and node impedances when the navigation route travels through neighborhood roads in a residential geographic area intermediate said first and second geographic locations; and utilizing said node impedance and route impedance to calculate the navigation route.

8. A method for calculating a navigation route between first and second geographic locations through a roadway network of roads intersecting at nodes, comprising:

providing a data structure having data indicative of a roadway network of roads intersecting at intersection nodes, said data including feature data indicative of traffic characteristics for associated roads;

calculating a route impedance for a navigation route through said roadway network between first and second geographic locations based on said feature data;

determining node impedances for intersection nodes though which the navigation route travels based on said feature data, said intersection nodes representing locations along the navigation route at which roads followed by the navigation route intersect other roads;

identifying when the navigation route travels along an exit ramp from a first road directly onto an entry ramp back onto the first road;

including an exit/entry ramp penalty in one of said node and route impedances based on said identification step; and utilizing said node impedance and route impedance to calculate the navigation route.

9. A method for calculating a navigation route between first and second geographic locations through a roadway network of roads intersecting at nodes, comprising:

providing a data structure having data indicative of a roadway network of roads intersecting at intersection nodes, said data including feature data indicative of traffic characteristics for associated roads;

calculating a route impedance for a navigation route through said roadway network between first and second geographic locations based on said feature data;

determining node impedances for intersection nodes though which the navigation route travels based on said feature data, said intersection nodes representing locations along the navigation route at which roads followed by the navigation route intersect other roads;

including an exit/entry ramp penalty with one of said route and node impedances when the navigation route travels along an exit ramp from a first road directly onto an entry ramp back onto the first road; and utilizing said node impedance and route impedance to calculate the navigation route.

10. A navigation device comprising;

memory for at least temporarily storing at least a portion of a data structure having data indicative of a roadway network of roads intersecting at nodes, said data structure including feature data indicative of traffic characteristics for associated roads, said memory stores feature data indicative of intersection angle information identifying an angle between roads intersecting at a node through which the route travels; and a processor accessing said memory and calculating, from said data structure, a route through said roadway network between geographic locations based on data indicative of route impedances associated with selected roads in the roadway network, said processor estimating node impedances for intersection nodes through which the route travels, said processor estimating node impedances based on said intersection angle information, said processor utilizing said route impedance and node impedance to calculate the route.

11. A navigation device comprising:

memory for at least temporarily storing at least a portion of data structure having data indicative of a roadway network of roads intersecting at nodes, said data structure including feature data indicative of traffic characteristics for associated roads, said memory storing feature data indicative of cross traffic turn information identifying whether a desired route through a node crosses on-coming traffic; and a processor accessing said memory and calculating, from said data structure, a route through said roadway network between geographic locations based on data indicative of route impedances associated with selected roads in the roadway network, said processor estimating node impedances for intersection nodes through which the route travels, said processor estimating node impedances based on said cross traffic turn information, said processor utilizing said route impedance and node impedance to calculate the route.

12. A navigation system comprising:

a storage unit holding a data structure having data indicative of roads in a roadway network and intersections of said roads at nodes;

a route calculation module calculating a planned route over the roadway network between source and destination locations based on the data structure held in the storage unit, said route calculation module avoiding said ramp shortcuts; and a correction module for identifying undesirable shortcuts constituting predefined paths along said roads and through said nodes in said roadway network route that, while reducing an overall distance traveled by a planned route, are to be avoided in said planned route between said source and destination locations, said correction module identifying ramp shortcuts along an exit ramp and entrance ramp of a road, said route calculation module avoiding said undesirable shortcuts.

13. A navigation system comprising:

a storage unit holding a data structure having data indicative of roads in a roadway network and intersections of said roads at nodes;

a route calculation module calculating a planned route over the roadway network between source and destination locations based on the data structure held in the storage unit; and a correction module for identifying undesirable shortcuts constituting predefined paths along said roads and through said nodes in said roadway network route that, while reducing an overall distance traveled by a planned route, are to be avoided in said planned route between said source and destination locations, said route calculation module avoiding said undesirable shortcuts, said correction module identifying neighborhood shortcuts through residential roads in said roadway network where said residential roads do not directly connect with either one of said source and destination locations, said route calculation module avoiding said neighborhood shortcuts.

14. A navigation system comprising:

a storage unit holding a data structure having data indicative of roads in a roadway network and intersections of said roads at nodes;

a route calculation module calculating a planned route over the roadway network between source and destination locations based on the data structure held in the storage unit; and a correction module for identifying undesirable shortcuts constituting predefined paths along said roads and through said nodes in said roadway network route that, while reducing an overall distance traveled by a planned route, are to be avoided in said planned route between said source and destination locations, said route calculation module avoiding said undesirable shortcuts, wherein said correction module includes a neighborhood progression module identifying when said planned route travels along residential roads located remote from said source and destination locations, said route calculation module updating said route to avoid residential roads that are remote from said source and destination locations based on neighborhood information received from said neighborhood progression module.

15. A navigation system comprising:

a storage unit holding a data structure having data indicative of roads in a roadway network and intersections of said roads at nodes;

a route calculation module calculating a planned route over the roadway network between source and destination locations based on the data structure held in the storage unit; and a correction module for identifying undesirable shortcuts constituting predefined paths along said roads and through said nodes in said roadway network route that, while reducing an overall distance traveled by a planned route, are to be avoided in said planned route between said source and destination, said route calculation module avoiding said undesirable shortcuts, wherein said route calculation module adds one of a distance and time penalty to potential routes that include at least one of exit/entrance ramp shortcuts and neighborhood shortcuts.

16. A computer program embodied on a computer-readable medium for estimating an impedance time through a node at an intersection between roads in a roadway network, comprising:

an identification source code segment identifying characteristic information for roads intersecting at a node in a roadway network, said characteristic information describing at least one feature concerning an associated road;

an estimation source code segment estimating an impedance time associated with potential delays by traffic traveling through the node based on the characteristic information for the roads intersecting at the node;

a source code segment obtaining a speed band associated with each road intersecting at the node, the speed band identifying a speed range in which traffic travels on the associated road; and a source code segment determining a speed differential between the speed bands, the speed differential representing a relative change between speed ranges of the roads intersecting at the node, the speed differential representing at least a portion of the characteristic information.

17. A computer program embodied on a computer-readable medium for estimating an impedance time through a node at an intersection between roads a roadway network, comprising:

an identification source code segment identifying characteristic information for roads intersecting at a node in a roadway network, said characteristic information describing at least one feature concerning an associated road, said identification source code segment obtains intersection angle information identifying an angle between the roads intersecting at the node, said intersection angle information representing at least a portion of the characteristic information; and an estimation source code segment estimating an impedance time associated with potential delays by traffic traveling through the node based on the characteristic information for the roads intersecting at the node.

18. A computer program embodied on a computer-readable medium for estimating an impedance time through a node at an intersection between roads in a roadway network, comprising:

an identification source code segment identifying characteristic information for roads intersecting at a node in a roadway network, said characteristic information describing at least one feature concerning an associated road, said identification source code segment obtains cross traffic turn information identifying whether a desired route through the node crosses oncoming traffic, said cross traffic turn information representing at least a portion of the characteristic information; and an estimation source code segment estimating an impedance time associated with potential delays by traffic traveling through the node based on the characteristic information for the roads intersecting at the node.

* * * * *